United States Patent [19]

Hanks et al.

[11] Patent Number: 4,934,500

[45] Date of Patent: Jun. 19, 1990

[54] FLUID PRESSURE RELEASING DEVICE FOR OVERLOAD APPARATUS

[75] Inventors: James V. Hanks, Robbinsdale; Ruth A. Litterick, Minneapolis, both of Minn.

[73] Assignee: Horton Manufacturing Co., Inc., Minneapolis, Minn.

[21] Appl. No.: 405,217

[22] Filed: Sep. 11, 1989

[51] Int. Cl.$^5$ .............................................. F16D 7/02
[52] U.S. Cl. .............................. 192/56 F; 192/114 R
[58] Field of Search .............. 192/56 F, 85 CA, 150, 192/114 R; 91/401

[56] References Cited

U.S. PATENT DOCUMENTS

| 2,683,512 | 7/1954 | Boice | 192/56 F |
|---|---|---|---|
| 2,842,240 | 7/1958 | Rice et al. | 192/56 F |
| 2,963,134 | 12/1960 | Banner | 192/56 F |
| 3,132,730 | 5/1964 | Dahlstrand et al. | 192/56 F |
| 3,205,986 | 9/1965 | Kramer | 192/56 F |
| 3,298,488 | 1/1967 | McDonald | 192/56 F |
| 3,664,474 | 5/1972 | Blake et al. | 192/56 F |
| 3,893,553 | 7/1975 | Hansen | 192/56 R |
| 4,081,063 | 3/1978 | Malmros et al. | 192/56 F |
| 4,770,281 | 9/1988 | Hanks | 192/56 R |

OTHER PUBLICATIONS

*Humphrey Air Control Specialists*, produced catalog, believed dated 1985, pp. 62–64.
"Products Update", *Power Transmission Design*, Oct. 1987, pp. 33–34.

*Primary Examiner*—Rodney H. Bonck
*Assistant Examiner*—Andrea Pitts
*Attorney, Agent, or Firm*—Peterson, Wicks, Nemer & Kamrath

[57] ABSTRACT

Device (200) for releasing fluid pressure from the pressure chamber of an overload clutch (A) is disclosed including a valve (210) captured in a radial cavity (202) in the cylinder (10) of the overload clutch (A) between a shoulder (204) and a valve cover (212) held by a snap ring (226). The valve cover (212) includes an aperture (228) for receiving a ball (230) and allowing the ball (230) to move radially inwardly to push against the spool member (220) of the valve (210) to unseat its head (221) from a seat (218) but preventing the ball (230) from moving out of the valve cover (212). The ball (230) rolls on a valve actuator (232) mounted to the piston (22). When the cylinder (10) and piston (22) are axially separated by fluid pressure, the ball (230) is located in a dent (234) formed in the valve actuator (232) such that the head (221) of the spool member (220) seals with the seat (218) and prevents release of fluid pressure from the pressure chamber. When the cylinder (10) and the piston (22) move axially against the normal bias direction of the fluid pressure, the ball (230) rolls out of the detent (234) and pushes against the spool member (220) to unseat the head (221) from the valve seat (218). In the most preferred form, the valve actuator (232) is adjustably mounted to the piston (22) by a turnbuckle (238), with the valve actuator (232) and the turnbuckle (238) formed of hexagonal stock for receipt in a wrench.

20 Claims, 1 Drawing Sheet

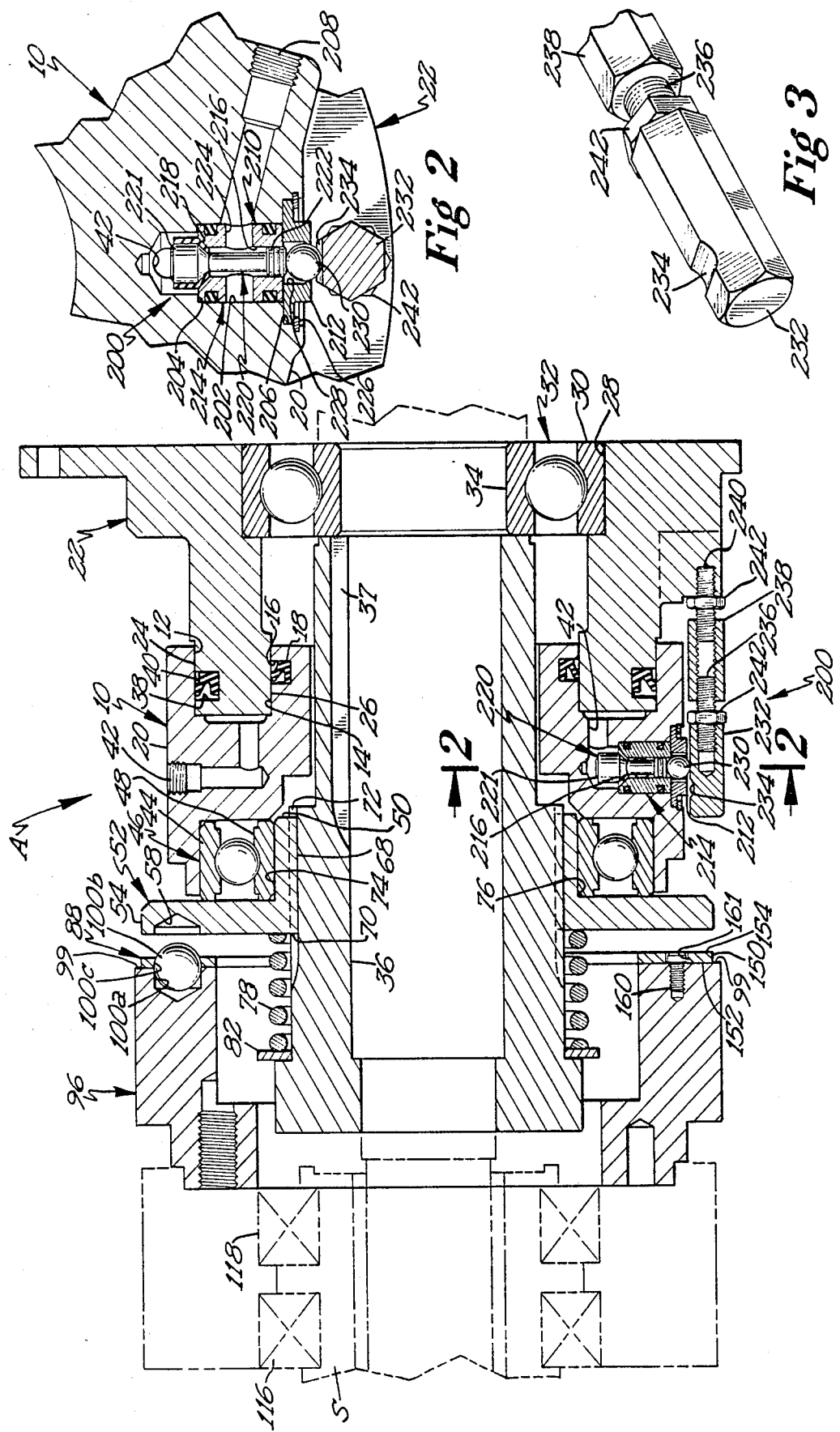

FLUID PRESSURE RELEASING DEVICE FOR OVERLOAD APPARATUS

BACKGROUND

The present invention generally relates to a device for releasing fluid pressure from the pressure chamber of rotational control devices, particularly to a device for releasing fluid pressure from the pressure chamber of overload apparatus, and specifically to a device for releasing fluid pressure from the pressure chamber of overload clutches.

In certain installations, clutches have been installed in line with torque limiting devices to prevent transfer of torque to the load beyond a certain overload level. In many of such installations, the prior separate clutch and torque limiting device may be replaced with an overload clutch, one type of which is shown in U.S. Pat. No. 4,770,281. It can then be appreciated that fluid pressure in the pressure chamber of the clutch continuously seeks to rotatably relate the input and the output, even when the output is at a constant overload level. It may be desirable in certain circumstances to require that the operator reset the overload device rather than have the device automatically attempt to return to a drive condition. For example, it maybe desirable for the operator to investigate the cause of the overload for correction prior to restarting. Further, excessive wear at the clutch interface may occur when the clutch continuously seeks to rotatably relate the input and the output especially when the output exceeds the overload level.

Resetting features may be incorporated into overload clutches such as the type shown and described in U.S. Pat. No. 4,770,281 by dumping the fluid pressure from the pressure chamber of the piston and cylinder when separation occurs at the interface signaling an overload condition. When the fluid pressure is dumped, the spring bias separates the interface until the pressure chamber is again pressurized. Prior attempts to incorporate this feature utilized specially manufactured, axially arranged valves mounted to the cylinder and which directly abutted with the piston. With this arrangement, it is necessary to completely disassemble the clutch and often dismantle the clutch installation to repair or maintain the axial valve. Thus, considerable downtime may be experienced to repair or maintain a minor cost item in the clutch.

Thus, a need has arisen for a device for dumping fluid pressure from the pressure chamber to obtain resetting features in pressure actuated overload apparatus which is actuable and accessible from the exterior of the overload apparatus and which utilizes off the shelf components to eliminate the capitol costs associated with specially manufactured components.

SUMMARY

The present invention solves these needs and other problems in pressure actuated overload apparatus by providing a device for releasing fluid pressure from the pressure chamber of the overload apparatus in the event that the cylinder and piston defining the pressure chamber moves in a direction opposite to the direction of the fluid pressure bias. The device includes a valve having a first condition allowing release of fluid pressure from the pressure chamber and a second condition preventing release of fluid pressure from the pressure chamber. In a first aspect of the present invention, the valve is located in a radial cavity formed in the cylinder and in fluid communication with the pressure chamber. In a further aspect of the present invention, the member which changes the valve condition is located radially outward of and external of the cylinder of the rotational control device.

It is thus an object of the present invention to provide a novel device for releasing fluid pressure from the pressure chamber of a rotational control apparatus.

It is further an object of the present invention to provide such a novel fluid pressure releasing device for overload apparatus.

It is further an object of the present invention to provide such a novel fluid pressure releasing device for overload clutches.

It is further an object of the present invention to provide such a novel fluid pressure releasing device actuable from the exterior of the apparatus.

It is further an object of the present invention to provide such a novel fluid pressure releasing device which is accessible from the exterior of the apparatus.

It is further an object of the present invention to provide such a novel fluid pressure releasing device which is accessible without dismantling the apparatus.

It is further an object of the present invention to provide such a novel fluid pressure releasing device which is accessible without removing the apparatus from its installation.

It is further an object of the present invention to provide such a novel fluid pressure releasing device utilizing an off the shelf release valve.

It is further an object of the present invention to provide such a novel fluid pressure releasing device utilizing stock materials which are machined to avoid the capital costs of casting.

It is further an object of the present invention to provide such a novel fluid pressure releasing device not subject to excessive wear.

It is further an object of the present invention to provide such a novel fluid pressure releasing device allowing easy adjustment.

It is further an object of the present invention to provide such a novel fluid pressure releasing device which may be easily incorporated into existing apparatus designs without high capital costs.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a cross sectional view of a fluid pressure releasing device according to the preferred teachings of the present invention installed in a clutch of the type shown in and described in U.S. Pat. No. 4,770,281.

FIG. 2 shows a partial cross sectional view of the device of FIG. 1 according to section line 2—2 of FIG. 1. FIG. 3 shows a perspective view of the valve actuator of the device of FIG. 1. All figures are drawn for ease of explanation of the basic teachings of the present invention only; the extensions of the FIG. with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inside", "outside", "radial", "axial", "inward", "outward", "end", "exterior", "face", and similar terms are used herein, it should be understood that these terms have reference only to the structure shown in the drawings as it would appear to a person viewing the drawings and are utilized only to facilitate describing the invention.

DESCRIPTION

A device for releasing fluid pressure from the cylinder or pressure chamber of a fluid engaged overload apparatus according to the preferred teachings of the present invention is shown in the drawings and generally designated 200. For purpose of explanation, device 200 has been shown for use in an overload single position clutch A of the type shown and described in U.S. Pat. No. 4,770,281. For purpose of explanation of the basic teachings of the present invention, the same numerals designate the same or similar parts in the present figures and the figures of U.S. Pat. No. 4,770,281. The description of the common numerals and clutch A may be found herein and in U.S. Pat. No. 4,770,281, which is hereby incorporated herein by reference. It should be noted that bearings 116 and 118 which rotatably support mount 96 are supported on a separate, stationary, hollow dead shaft S in clutch A shown and are not supported in any manner by hub 36 in a manner as shown in U.S. Pat. No. 4,770,281. It can be further noted that clutch A has other subtle differences in construction and shape from the preferred form shown in U.S. Pat. No. 4,770,281. For example, a single spring 78 is utilized in clutch A of the form shown in the drawings hereof rather than the multiplicity of springs 78 in the form of clutch A shown in the drawings of U.S. Pat. No. 4,770,281. As the differences in construction between clutch A shown herein and in U.S. Pat. No. 4,770,281 do not concern the construction, use, and operation of device 200 of the present invention, further explanation of the construction and operation of clutch A should not be necessary after a person skilled in the art is familiar with and understands the teachings of U.S. Pat. No. 4,770,281.

It should be further appreciated that clutch A plays no part of the present invention and specifically, device 200 can be utilized in clutches, overload apparatus, and like rotational control apparatus of similar as will as different types than clutch A shown in the preferred form of the present invention.

Device 200 generally includes a radial cavity 202 formed in cylinder 10 and in fluid communication with the pressure chamber formed and defined by cylinder 10 and piston 22. In the most preferred form, cavity 202 intersects with inlet 42 to the pressure chamber. In the preferred form, the radial inward end of cavity 202 terminates in a shoulder 204 and the radial outward end of cavity 202 terminates in an expanded cavity 206. A fluid passage 208 extends from cavity 202 to the exterior of cylinder 10 and in the preferred form extends along a chord of cylinder 10.

Device 200 further includes a release valve 210 which is received in cavity 202 and held therein by shoulder 204 and a valve cover 212 received in expanded cavity 206. In the most preferred form, valve 210 is a commercially available, off the shelf variety and in the most preferred form is manufactured by Humphrey Products Kilgore at Sprinkle of Kalamazoo, Mich. Specifically, valve 210 includes a body 214 of a size for receipt in and sealing with cavity 202 such as with O-rings as shown. Body 214 includes a central passage 216 terminating at its radially inward end in a tapered seat 218. An outlet 224 is formed in body 214 intersecting with passage 216 and for providing fluid communication with fluid passage 208. Valve 210 further includes a spool member 220 having an enlarged held 221 of a size for receipt and sealing with seat 218 of passage 216 of body 214 and having a piston portion 222 for reciprocal receipt in and sealing with passage 216 such as with O-rings as shown.

Valve cover 212 has a shape complementary to and for receipt in expanded cavity 206 and is held in cylinder 10 by any suitable means such as a snap ring 226 as shown in the most preferred form. Cover 212 further includes an aperture 228 including a first, cylindrical portion extending from the face of cover 212 which abuts with valve 210 and a second portion extending from the first portion to the opposite face of cover 212. The second portion of aperture 228 in the preferred form is frustoconical in shape having a diameter equal to the diameter of the first portion at their intersection and decreasing to a diameter at the opposite face which is less than the diameter of the first portion of aparture 228. The diameter of the first portion of aperture 228 is greater than the diameter of passage 216 of body 214.

Device 200 according to the preferred teachings of the present invention further includes an actuator ball 230 having a diameter of a size for receipt in the first portion of aperture 228 but larger than the second portion of aperture 228 and passage 216. Thus, aperture 228 allows ball 230 to move radially inward to engage spool member 220 but prevents ball 230 from moving radially out of valve cover 212.

Device 220 according to the preferred teachings of the present invention further includes a valve actuator 232 adjustably mounted to piston 22 for changing the condition of valve 210. Specifically, actuator 232 is formed from hexagonal stock and includes a detent 234 machined on a side that ball 230 engages or rolls upon for receipt of actuator ball 230. A threaded screw 236 is axially threadably received in valve actuator 232 and in a turnbuckle 238. A second threaded screw 240 is axially threadably received in turnbuckle 238 axially in line with screw 236 and in piston 22. Locking nuts 242 can be provided on screws 236 and 240. In the most preferred form, turnbuckle 238 is formed from the same hexagonal stock as actuator 232.

Now that the basic construction of device 200 according to the preferred teachings of the present invention has been set forth, the operation and subtle features of device 200 can be explained and appreciated. In the absence of fluid pressure to inlet 42, spring 78 biases drive ring 52 away from mount 96, and due to its interconnection to drive ring 52 through bearing 46, cylinder 10 is thus biased in a first position as shown in FIG. 1. In the first position, cylinder 10 is positioned relative to valve actuator 232 such that ball 230 is located outside of detent 234 and abuts with the side of actuator 232. Actuator 232 then pushes ball 230 radially inwardly in aperture 228 of valve cover 212 and into passage 216 of body 214. Ball 230 in turn abuts and pushes spool member 220 radially inwardly raising head 221 from seat 218 in a manner as shown in FIG. 1. With head 221 raised from seat 218, valve 210 is in a first condition where fluid pressure passage is allowed from the fluid pressure chamber of cylinder 10 and piston 22 and from inlet 42 around head 221 into passage 216 and through outlet 224 and passage 208. Thus, any fluid pressure remaining in the fluid pressure chamber of cylinder 10 and piston 22 and/or introduced through inlet 42 would pass through outlet 224 and passage 208.

To engage and relate drive disc 52 to mount 96, it is required to block outlet 224 to prevent escape of fluid pressure therethrough. Blockage of outlet 224 can be accomplished by a variety of means, not shown, such as a solenoid valve in fluid communication with passage 208. With the blockage of outlet 224, fluid pressure introduced into inlet 42 will pressurize the pressure chamber causing movement of cylinder 10 relative to piston 22 and against the bias of spring 78 from the first position to a second position. Due to its interconnection to cylinder 10 through bearing 46, drive ring 52 moves to engage mount 96 and to register ball 100b in cavity 58 to rotatably relate drive ring 52 and mount 96.

With the movement of cylinder 10 relative to piston 22, cylinder 10 and ball 230 carried thereby also moves relative to valve actuator 232 which is mounted to piston 22. Thus, ball 230 rolls upon valve actuator 232 and seeks to and registers with detent 234 of valve actuator 232 when ball 100b registers with cavity 58. With the registry of ball 230 in detent 234, spool member 220 is free to move radially outwardly until head 221 mates and seals with seat 218 placing valve 210 in its second condition. It should be noticed that spool member 220 may move radially outwardly under the bias of the fluid pressure being introduced into inlet 42 which also biases movement of cylinder 10 relative to piston 22. If desired, spool member 220 may be biased by a spring extending between head 221 of spool member 220 and inlet 42. After ball 230 has registered in detent 234, blockage of outlet 224 may be removed to allow operation of device 200 according to the teachings of the present invention as valve 210 prevents escape of fluid pressure through outlet 224. It can be further appreciated that fluid pressure through inlet 42 may be reduced and/or varied from a higher, initiation pressure necessary to overcome rotational inertia to a lower, running pressure while clutch A is on the run.

In the event that the torque overload level of clutch A is reached, ball 100b cams out of cavity 58 which moves drive ring 52 from its second position to its first position. Due to its interconnection to drive ring 52 through bearing 46, cylinder 10 and ball 230 carried thereby also move relative to valve actuator 232 such that ball 230 moves or rolls out of detent 234 and raises head 221 of spool member 220 from seat 218 releasing fluid pressure from the pressure chamber. Upon release of fluid pressure through valve 210, drive ring 52 moves under the bias of spring 78 to its first position. It can then be appreciated that the release of fluid pressure through valve 210 prevents the chattering of ball 100b with cavity 58 which may occur if fluid pressure would continuously seek to move drive ring 52 to engage mount 96 when a torque overload level was reached. Valve 210 then automatically prevents reactivation of clutch A until the operator has had an opportunity to evaluate the cause of the torque overload level and again block outlet 224 to allow repressurization of the pressure chamber in a manner as previously set forth.

It should be appreciated that device 200 according to the preferred teachings of the present invention is believed to be particularly advantageous. Specifcally, valve 210 is not subject to excessive wear. Particularly, head 221 of spool member 220 and sent 218 are not subject to wear and specifically do not require the use of O-rings or the like to maintain a sealing relation. Further, valve 210 is an off the shelf item and does not require the manufacturer of clutch A to specifically manufacture valve 210 and thus encounter the high capital cost of tooling, inventory, and the like. Additionally, if valve 210 should require replacement, easy access to valve 210 can be obtained from the exterior of clutch A and specifically without requiring removal of clutch A from its installation and/or dismantling of clutch A. Specifically, by removing valve actuator 232 threadably attached to turnbuckle 238, snap ring 226, and valve cover 212 including ball 230, valve 210 may simply be pulled from cavity 202 without disturbing any other portions of clutch A and replaced or repaired as necessary.

It should further be noted that adjustment of the location of valve actuator 232 relative to cylinder 10 may be easily accomplished from the exterior of clutch A by threading screws 236 and 240 relative to valve actuator 232, turnbuckle 238, and piston 22. It should then be noted that the hexagonal shape of valve actuator 232 and turnbuckle 238 is particularly advantageous as it readily accepts a standard, open ended wrench to allow the threaded adjustment of screws 236 and 240 relative to valve actuator 232, turnable 238, and piston 22.

It can further be appreciated that screws 236 and 240, nuts 242, and snap ring 226, as is valve 210. are all off the shelf items not requiring special manufacturing. Further, valve actuator 232, turnbuckle 238, and valve cover 212 may be machined from stock material, with valve actuator 232 and turnbuckle 238 being formed from the same stock material. Further, cavities 202 and 236 and passage 208 may be easily machined in cylinder 10 of clutch A. Thus, the feature of the automatic lock out of engagement of clutch A in the event that a torque overload level is reached can be easily incorporated into clutch A without high capital costs.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a rotational control device including a piston and a cylinder defining a pressure chamber, with the cylinder being movable relative to the piston from a first position to a second position in response to the introduction of fluid pressure into the pressure chamber, a device for releasing fluid pressure from the pressure chamber comprising, in combination: a radial cavity formed in the cylinder, with the radial cavity being in fluid communication with the pressure chamber; a valve located in the radial cavity having a first condition allowing release of fluid pressure through the radial cavity and a second condition preventing release of fluid pressure through the radial cavity; and means for changing the valve from its second condition to its first condition in the event that the cylinder and piston move from its second position to its first position.

2. The fluid pressure releasing device of claim 1 wherein the changing means comprises a valve actuator mounted to the piston for relative movement with respect to the cylinder for actuating the valve.

3. The fluid pressure releasing device of claim 2 wherein the changing means further comprises, in combination: a ball abutting the valve for changing the valve between the first and second conditions, with the valve actuator including a detent for receiving the ball.

4. The fluid pressure releasing device of claim 3 wherein the valve actuator is adjustably mounted to the piston.

5. The fluid pressure releasing device of claim 4 wherein the valve actuator has a hexagonal cross section for receipt in a wrench, with the valve actuator being threadably secured to the piston by a first screw.

6. The fluid pressure releasing device of claim 5 further comprising, in combination: a turnbuckle, a second screw, with the first screw being threadably secured to the valve actuator and the turnbuckle, with the second screw being threadably secured to the piston and the turnbuckle.

7. The fluid pressure releasing device of claim 2 wherein the piston is stationary.

8. The fluid pressure releasing device of claim 1 further comprising, in combination: an expanded cavity formed in the cylinder, with the radial cavity terminating in a shoulder and in the expanded cavity; and a valve cover for receipt in the expanded cavity, with valve captured between the shoulder and the valve cover.

9. The fluid pressure releasing device of claim 8 wherein the changing means comprises a ball for abutting the valve, with the valve cover having an aperture formed therein for receiving the ball allowing the ball to move radially inward but preventing the ball from moving radially out of the valve cover.

10. The fluid pressure releasing device of claim 9 wherein the valve cover is held in the expanded cavity by a snap ring.

11. The fluid pressure releasing device of claim 9 wherein the changing means further comprises, in combination: a valve actuator mounted to the piston for relative movement with respect to the cylinder for actuating the valve, with the valve actuator including a detent for receiving the ball.

12. The fluid pressure releasing device of claim 3 wherein the valve comprises, in combination: a body including a passage terminating in a valve seat; a spool member reciprocally received in the passage and including a head for sealing with the seat of the passage in the second condition of the valve and for allowing escape of fluid pressure in the first condition of the valve, with the ball abutting and moving the spool member.

13. The fluid pressure releasing device of claim 12 wherein the spool member further includes a piston portion for reciprocal receipt and sealing with the passage of the body, with the body including an outlet formed in the passage intermediate the seat and the piston portion to allow for escape of fluid pressure from the passage therethrough.

14. The fluid pressure releasing device of claim 1 wherein the rotational control device is a clutch.

15. The fluid pressure releasing device of claim 14 wherein the rotational control device is a single position clutch.

16. In a rotational control device including a piston and a cylinder defining a pressure chamber, with the cylinder being movable relative to the piston from a first position to a second position in response to the introduction of fluid pressure into the pressure chamber, a device for releasing fluid pressure from the pressure chamber comprising, in combination: a valve mounted to the cylinder and in fluid communication with the pressure chamber, with the valve having a first condition allowing release of fluid pressure from the pressure chamber and a second condition preventing release of fluid pressure from the pressure chamber; and means located radially outward of the cylinder for changing the valve from its second condition to its first condition in the event that the cylinder and piston move from its second position to its first position.

17. The fluid pressure releasing device of claim 16 wherein the changing means comprises a valve actuator mounted to the piston for relative movement with respect to the cylinder for actuating the valve.

18. The fluid pressure releasing device of claim 17 wherein the changing means further comprises, in combination: a ball abutting the valve for changing the valve between the first and second conditions, with the valve actuator including a detent for receiving the ball.

19. The fluid pressure releasing device of claim 18 wherein the valve comprises, in combination: a body including a passage terminating in a valve seat; a spool member reciprocally received in the passage and including a head for sealing with the seat of the passage in the second condition of the valve and for allowing escape of fluid pressure in the first condition of the valve, with the ball abutting and moving the spool member.

20. The fluid pressure releasing device of claim 19 wherein the spool member further includes a piston portion for reciprocal receipt and sealing with the passage of the body, with the body including an outlet formed in the passage intermediate the seat and the piston portion to allow for escape of fluid pressure from the passage therethrough.

* * * * *

UNITED STATES PATENT OFFICE
CERTIFICATE OF CORRECTION

Patent No. 4,934,500    Dated June 19, 1990

Inventor(s) James V. Hanks and Ruth A. Litterick

It is certified that error appears in the above-identified patent and that said Letters Patent is hereby corrected as shown below:

Column 2, line 61, "FIG. 3" should start a new paragraph.

Column 2, line 62, "All" should start a new paragraph.

Column 3, line 55, cancel "will" and substitute therefor --well--.

Column 4, line 15, cancel "held" and substitute therefor --head--.

Column 4, line 31, cancel "aparture" and substitute therefor --aperture--.

Column 6, line 1, cancel "block" and substitute therefor --blocks--.

Column 6, line 36, cancel "." and substitute therefor --,--.

Column 6, line 42, cancel "236" and substitute therefor --206--.

Signed and Sealed this

Sixteenth Day of July, 1991

Attest:

HARRY F. MANBECK, JR.

Attesting Officer

Commissioner of Patents and Trademarks